Oct. 9, 1934.  C. HIGGINS  1,976,497
TEA BAG
Filed June 28, 1932
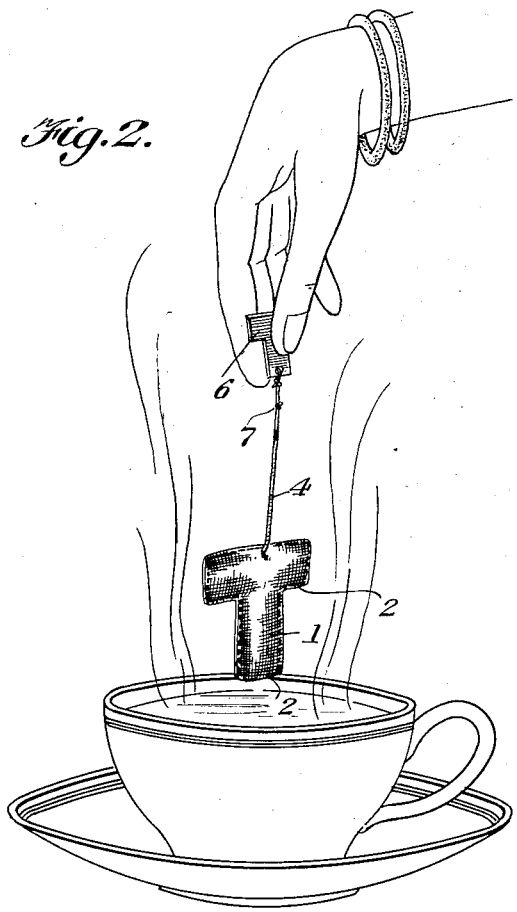
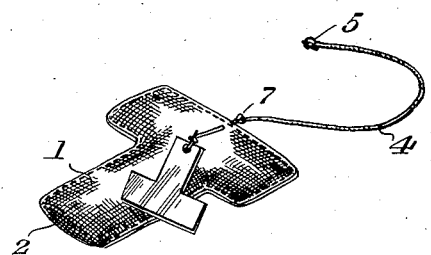
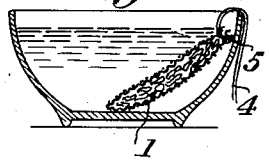
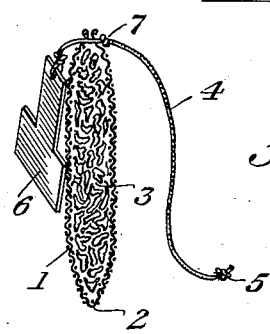
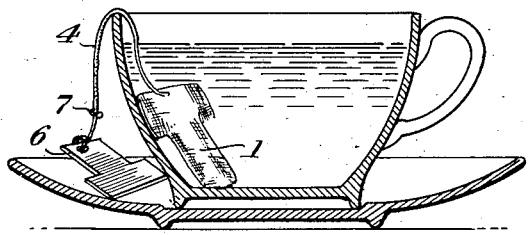
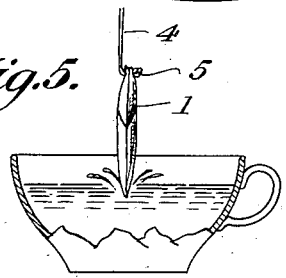
Clarence Higgins
INVENTOR Patented Oct. 9, 1934

1,976,497

UNITED STATES PATENT OFFICE 1,976,497

TEA BAG

Clarence Higgins, Jamaica, N. Y.

Application June 28, 1932, Serial No. 619,794

5 Claims. (Cl. 53—3)

This invention relates to tea brewing bags and its general object is to provide a bag or container that is shaped to present substantially narrow portions or tea receiving compartments that have substantially sharp edges to prevent splashing when dropped in water, and as the bag is susbtantially flat, the tea is sufficiently spread in a layer so that the entire contents of the bag will be readily and quickly acted upon by the water, thereby materially expediting the brewing process, as well as to extract full flavor and strength from the tea within the bag.

A further object of the invention is to provide a tea brewing appliance in the form of a bag of a shape to be indicative of its contents, and the appliance includes a tag of like shape that is secured to the bag by a flexible element or cord in a manner to prevent the cords and tags of a number of bags within a package, from becoming entangled, therefore a single bag can be freely removed from the package.

Another object of the invention is to provide a tea bag that is simple in construction, considering its many advantages, is neat in appearance, inexpensive to manufacture and extremely efficient in use and results obtained thereby.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:—

Figure 1 is a perspective view of the device which forms the subject matter of the present invention.

Figure 2 is a view illustrating the manner of using the device.

Figure 3 is a longitudinal sectional view taken through the bag with the cord and tag in elevation.

Figure 4 is a sectional view illustrating the position assumed by the device after being disposed in a cup of water.

Figure 5 is a view illustrating the minimum splashing action that takes place when dropping my bag in a cup of water.

Figure 6 is a similar view illustrating the position assumed by my bag in a cup of water.

Referring to the drawing in detail, it will be noted that I have illustrated the use of my tea brewing device with a cup of water, but I want it understood that it can be used with any receptacle of water and can be made in various sizes without departing from the spirit of the invention.

The device or appliance includes a bag 1 which may be woven into the desired shape or produced in any manner from material of any kind, suitable for the purpose, such as open mesh muslin of light weight, cheesecloth or the like and in the form best shown in Figures 1 and 2 it is substantially T-shape in configuration but of course it can be of any shape, with one or more compartments, providing the tea compartment or compartments of the bag are substantially flat with rounded sides, and have substantially sharp edges, when filled with tea, as these features are extremely important and the advantages accomplished thereby will be presently described.

In producing the substantially T-shaped bag, the strip of fabric is cut in the form of a double-T which is folded midway its ends to dispose the vertical portions and horizontal portions in contacting engagement. The edges of the portions are then stitched or sewed together, with the exception of an opening to allow for the passage of the tea within the bag. The opening is then stitched to closed position, with the result a bag of tea is provided and the bag is not only in the shape of the letter T but includes compartments that are narrow, with substantially sharp edges 2, so that when it is dropped within a receptacle of water as shown in Figure 5, it will have a tendency to cut the water and thereby substantially prevent splashing.

The T-shape configuration of the bag also indicates the contents thereof, or in other words informs the user that the bag contains tea but a more important purpose for shaping the bag accordingly, is to provide one that has communicating portions or tea receiving compartments that are narrow and substantially flat, so that the tea is spread in a substantially thin layer as at 3, whereby when the bag is disposed in a receptacle of water, the entire contents thereof will be readily and quickly acted upon, which will of course, result in expeditiously extracting full flavor and strength. Such is only possible when use is made of the conventional spherical shape bag, by prolonged steeping, and tea when quickly brewed is far superior in every respect to tea which results from prolonged steeping. The particular configuration of my bag not only prevents the tea from falling in a heap at the bottom thereof, but has a tendency to cause the bag to set in a substantially upright position in a cup or the like, so that minimum surface of the bag will contact the cup, and the water can act simultaneously on the entire mass of tea in a uniform manner, which of course materially contributes to the expeditious brewing action as well as extracts the full flavor accordingly.

I also provide a convenient means for handling the bag and this means includes a flexible element in the form of a cord 4 that is knotted at one end as at 5, while secured to its opposite end is a handle 6 in the form of a letter T. Arranged adjacent the connection of the cord with the handle 6 is a knot 7 that is smaller than the knot 5, and the knot 7 is of a size whereby it may be passed through the bag 1, but is adapted to retain the handle 6 in close proximity to the bag as clearly shown in Figure 3. The purpose of this feature is to prevent the cords and handles from becoming entangled with each other when packed, as it will be obvious that in the event the tags were arranged on one end of the cord and the bag secured to the opposite end thereof, that the tags and cords will become commingled with each other and therefore entangled when a quantity of the devices are disposed within a package, as the devices are commercialized in numbers disposed in containers or packages. In removing the bag from a package the handle 6 is grasped, thence the knot 7 is pulled through the bag until the knot 5 is reached. The device is then used as shown in Figure 2 which illustrates a further advantage of the shape of the bag, with the cord attached thereto as shown, as the shape causes the weight of the tea to be evenly distributed, and with the point of the attachment of the cord being midway the ends of the upper compartment, it will be obvious that the bag will be practically perfectly balanced, with the small end of the lower compartment lowermost, so that even if the bag is dropped in a cup of water, the narrow lower end will contact the water first and thereby cut the water, with the result splashing will be eliminated.

The flat, narrow configuration of the bag also takes up minimum space in packing, with the result a greater number of my devices can be packed within a given receptacle than bags of the usual shape. Again, the flat configuration presents a neater appearance.

From the above description and disclosure of the drawing, it will be obvious that I have provided a tea brewing bag that includes a great number of advantages over the bag now in common use, and the same may be said with respect to the means for handling my bag when compared with the means that is connected with the spherical bag, as it is practically impossible for the cords 4 and the handles 6 becoming entangled, due to the fact that the handles are normally arranged in close proximity to the bags before use is made of the latter, as best shown in Figure 3.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A tea brewing appliance comprising a bag with tea therein and being substantially flat with sharp corners, means for handling said bag and including a cord knotted at one end, a handle secured to its opposite end, means forming a part of the cord and arranged adjacent the last mentioned end thereof to normally retain the handle in close proximity to said bag, and said means being capable of passage through said bag.

2. A tea brewing appliance comprising a substantially flat fabric bag having sharp edges, means for handling said bag and including a cord knotted at one end, a handle secured to the opposite end of said cord and said cord being knotted adjacent the handle to normally hold the handle in close proximity to the bag and the last mentioned knot being of a size to be forced through said bag.

3. A tea brewing appliance comprising a bag formed from fabric material and being substantially flat and provided with substantially sharp edges, means for handling said bag and including a cord having a knot formed at one end, a handle secured to the opposite end, and means arranged in the cord adjacent the handle to normally hold the latter in close proximity to the bag, and said means being adapted to be forced through said bag when use is made of the handle.

4. A tea brewing appliance comprising a container with tea therein, and including relatively narrow substantially flat compartments disposed at substantial angles with respect to each other, and said compartments being provided with closed substantially sharp outer edges.

5. A tea brewing appliance comprising a container with tea therein, and including compartments disposed in communication with each other, said compartments being relatively narrow and substantially flat and disposed at right angles with respect to each other, and said compartments having closed substantially sharp outer edges.

CLARENCE HIGGINS.